United States Patent
Won et al.

(10) Patent No.: US 9,967,830 B2
(45) Date of Patent: May 8, 2018

(54) METHOD FOR CONTROLLING CONTENT TRANSMISSION AND ELECTRONIC DEVICE FOR SUPPORTING THE SAME

(71) Applicant: Samsung Electronics Co., Ltd., Gyeonggi-do (KR)

(72) Inventors: Hyun Suk Won, Seoul (KR); Su Hyung Kim, Seoul (KR); Jin Heo, Busan (KR); Hyung Suk Kim, Gyeonggi-do (KR); Bong Gon Kim, Gyeonggi-do (KR); Kwan Woong Song, Gyeonggi-do (KR); Seung Bum Lee, Gyeonggi-do (KR); Sung Dae Cho, Gyeonggi-do (KR); Seung Seok Hong, Gyeonggi-do (KR); Jae Yong Yang, Gyeonggi-do (KR); Choel Min Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/214,918

(22) Filed: Jul. 20, 2016

(65) Prior Publication Data

US 2017/0041881 A1 Feb. 9, 2017

(30) Foreign Application Priority Data

Aug. 7, 2015 (KR) ........................ 10-2015-0111873

(51) Int. Cl.
*H04W 52/28* (2009.01)
*H04W 52/18* (2009.01)
(Continued)

(52) U.S. Cl.
CPC ......... *H04W 52/18* (2013.01); *H04W 52/223* (2013.01); *H04W 52/28* (2013.01); *H04W 52/343* (2013.01)

(58) Field of Classification Search
CPC ... H04W 52/18; H04W 52/223; H04W 52/28; H04W 52/343
See application file for complete search history.

(56) References Cited

U.S. PATENT DOCUMENTS 7,664,126 B2   2/2010 Funato
2005/0286422 A1 12/2005 Funato
(Continued)

FOREIGN PATENT DOCUMENTS

JP      2009-89404 A      4/2009
KR   10-2009-0074147 A   7/2009

*Primary Examiner* — David Bilodeau
(74) *Attorney, Agent, or Firm* — Cha & Reiter, LLC

(57) ABSTRACT

A portable electronic device is provided. The portable electronic device includes a communication interface, a memory configured to store multimedia data obtained through at least one camera operatively connected with the memory, and a processor. The processor is configured to transmit at least part of the multimedia data to an external electronic device through a network using a first transmit power function of the portable electronic device, through the communication interface, to determine context information associated with at least one of the portable electronic device and the network, and to change from the first transmit power function to a second transmit power function of the portable electronic device if the context information corresponds to a condition.

17 Claims, 8 Drawing Sheets

(51) Int. Cl.
*H04W 52/22* (2009.01)
*H04W 52/34* (2009.01)

(56) References Cited

U.S. PATENT DOCUMENTS

| | | | |
|---|---|---|---|
| 2009/0111506 A1* | 4/2009 | Laroia | H04W 28/22 |
| | | | 455/550.1 |
| 2009/0222576 A1 | 9/2009 | Elstermann et al. | |
| 2010/0273517 A1* | 10/2010 | Pinheiro | H04B 1/036 |
| | | | 455/522 |
| 2011/0019555 A1 | 1/2011 | Gotoh et al. | |
| 2012/0157043 A1* | 6/2012 | LaJoie | G06Q 30/0256 |
| | | | 455/407 |
| 2013/0279914 A1* | 10/2013 | Brooks | H04Q 11/0067 |
| | | | 398/66 |
| 2016/0277802 A1* | 9/2016 | Bernstein | H04N 21/4788 |

\* cited by examiner

METHOD FOR CONTROLLING CONTENT TRANSMISSION AND ELECTRONIC DEVICE FOR SUPPORTING THE SAME

CLAIM OF PRIORITY

This application claims the benefit under 35 U.S.C. § 119(a) of a Korean patent application filed on Aug. 7, 2015 in the Korean Intellectual Property Office and assigned Serial number 10-2015-0111873, the entire disclosure of which is hereby incorporated by reference.

TECHNICAL FIELD

The present disclosure relates to methods for controlling transmission power.

BACKGROUND

Recently, there has been a growing trend towards users who broadcast live using their electronic devices such as smartphones. Electronic devices provide capturing functions through their cameras and the like and communication functions for transmitting captured images such that their users broadcast live. When users broadcast live, electronic devices may transmit encoded video packets to broadcast servers until the live broadcasts are ended to minimize end-to-end delay.

Mobile electronic devices (or portable electronic devices) such as smartphones have limited battery capacity. This results in increasing current consumption and/or heating if transmitting data, for example, packets for a longer time.

SUMMARY

Aspects of the present disclosure are to address at least the above-mentioned problems and/or disadvantages and to provide at least the advantages described below. Accordingly, an aspect of the present disclosure is to provide a method for controlling content transmission to control a transmit power function, associated with setting a transmission time of data or setting a transmit power of the data, based on context information of an electronic device (e.g., heating information of the electronic device or traffic information of a network, and the like) and the electronic device for supporting the same.

In accordance with an aspect of the present disclosure, a portable electronic device is provided. The portable electronic device may include a communication interface, a memory configured to store multimedia data obtained through at least one camera operatively connected with the memory, and a processor. The processor may be configured to transmit at least part of the multimedia data to an external electronic device through a network using a first transmit power function of the portable electronic device, through the communication interface, to determine context information associated with at least one of the portable electronic device and the network, and to change the first transmit power function to a second transmit power function of the portable electronic device if the context information corresponds to a condition.

In accordance with another aspect of the present disclosure, a method for controlling content transmission in a portable electronic device is provided. The method may include obtaining multimedia data through at least one camera operatively connected with the portable electronic device, collecting context information associated with at least one of the portable electronic device and a network connected with an external electronic device through a communication interface of the portable electronic device, selecting a transmit power function of the portable electronic device, by setting at least one of a transmission time of the multimedia data and a transmit power of the multimedia data, based in part on the context information, and transmitting the multimedia data using the transmit power function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
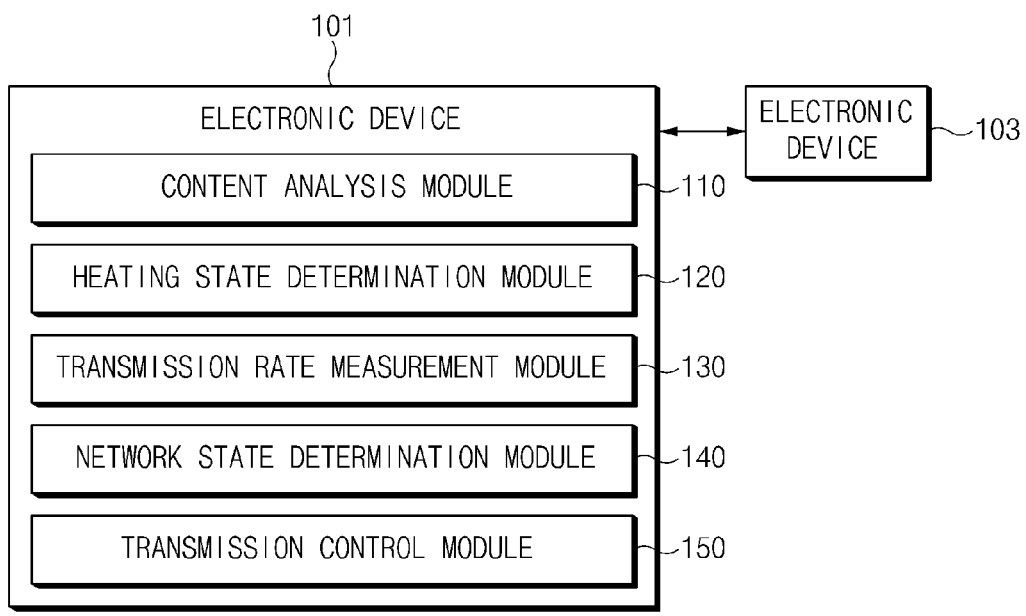
FIG. 1 is a block diagram illustrating a configuration of an electronic device associated with controlling content transmission according to various embodiments.

Hereinafter, the present disclosure is described with reference to the accompanying drawings. However, the present disclosure is not intended to be limited to the specific embodiments, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items.

For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element). The term "wirelessly connected to" shall include the situation where two devices communicate to each other over a point-to-point radio channel.

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device associated with controlling transmission according to various embodiments. According to various embodiments, an electronic device 101 may connect with an external electronic device 103 through wired/wireless communication and may send data to the external electronic device 103. For example, the electronic device 101 may send a variety of content (e.g., text, an image, an audio, or a video and the like) to the external electronic device 101. According to an embodiment, the electronic device 101 may send a broadcast image to the external electronic device 103 which is a broadcast server, in connection with a live broadcasting service. In this regard, the electronic device 101 may send, for example, the data in units of packets. The packets can have a fixed number of bytes or variable number of bytes.

According to various embodiments, the electronic device 101 may set a transmit power function based on context information of the electronic device 101. The context information can include, but is not limited to, the temperature of the electronic device 101 or the traffic load of the network connected. The transmit power function may include data transmission time, a transmission pause time, additional transmission times, functions thereof, and the like in connection with data transmission of the electronic device 101. The transmit power function can also include, but is not limited to, a function for setting a supply power level of a transmitter which transmits data, and the like. According to an embodiment, if the internal temperature of the electronic device 101 is greater than or equal to a specific temperature, the electronic device 101 may increase a transmission pause time to reduce an amount of current consumed by data transmission. Therefore, the electronic device 101 may reduce heating by current consumption. Alternatively, if the internal temperature of the electronic device 101 is greater than or equal to the specific temperature, the electronic device 101 may reduce an amount of current consumed by data transmission by reducing a supply power level of the transmitter. According to another embodiment, if traffic of the network exceeds a predetermined level, the electronic device 101 may reduce transmission pause time or may increase a supply power level of the transmitter to improve throughput. According to various embodiments, the electronic device 101 may stop sending packets at periodic intervals to the external electronic device 103. For example, after the electronic device 101 sends packets during a designated time, if data to be sent to a transmit buffer is of a specific size or less, the electronic device 101 may stop sending packets during a designated time. Therefore, the electronic device 101 may reduce an amount of current consumed by packet transmission. Also, the electronic device 101 may reduce, for example, heating by current consumption.

Referring to FIG. 1, the electronic device 101 may include a content analysis module 110, a heating state determination module 120, a transmission rate measurement module 130, a network state determination module 140, and a transmission control module 150. It is noted that only certain components of the electronic device 101 are shown for ease of explanation and understanding. FIG. 1 is not intended to be exhaustive and the electronic device 101 may further components other than the above-mentioned components. Furthermore, in certain embodiments, at least one of the above-mentioned components of the electronic device 101 may be omitted from the electronic device 101.

The content analysis module 110 may perform, for example, a function of analyzing content (e.g., multimedia data) to be sent to the external electronic device 103. According to an embodiment, the content analysis module 110 may determine a bitrate (or a data throughput (or a data transmission amount) per unit time) from the content. For example, the content analysis module 110 may extract a bitrate from an image captured in connection with a live broadcast. Therefore, the electronic device 101 may determine quality (e.g., sound quality or image quality and the like) of content to be sent. In this regard, the bitrate of the content may refer to an amount of data used when the content is encoded. Therefore, if the bitrate of the content is set to be relatively higher than a specific bitrate, quality of the content may become good, but data capacity after the content is encoded may be increased. According to various embodiments, the content analysis module 110 may analyze complexity of the content. For example, the content analysis module 110 may analyze types of display objects included in the content, the number of the display objects, or motion of the display objects, and the like. According to an embodiment, if there are various types of display objects included in the content, if there are a number of display objects included in the content, or if display objects included in the content have much motion, the content analysis module 110 may set complexity to be higher. Also, if there is an image with little motion (e.g., if display objects included in an image are fixed things or if there is an image in which a coordinate of a designated range or more is not changed), the content analysis module 110 may set complexity to be lower. In certain embodiments of the present invention, where video is coded using MPEG 2 or 4, degree of motion can be ascertained by examining motion vectors of data dependent frames.

For example, certain media, such as audio, video, and audio/video data has a time base. For example, from video data, the content analysis module 110 can retrieve or ascertain information such as the frame rate, e.g., 30 frames/second, 60 frames/second, etc. By determining the amount of data that consecutive frames consume and the frame rate, the content analysis module 110 can determine the bit rate. In certain embodiments, the content can be according to the MPEG format. In certain embodiments, the content analysis module 110 can examine the field known as "Presentation Time Stamps" between two particular frames. The amount of data that the two particular frames consume, as well as the amount of data that all frames with presentation time stamps within the interval of the presentation time stamps of the two particular frames divided by the difference the presentation time stamps of the particular frames can represent the bit rate.

The heating state determination module 120 may determine the temperature of the electronic device 101. According to an embodiment, the heating state determination module 120 may measure the temperature based on a thermometer or temperature sensor of the electronic device 101. The thermometer/temperature sensor may be disposed to be adjacent to a battery of the electronic device 101 or may be arranged to be adjacent to a communication processor (or a communication chip) associated with data communication.

The transmission rate measurement module 130 may measure, for example, a transmission rate of a communication network connected with the external electronic device 103. According to an embodiment, after sending packets during a designated time, the transmission rate measurement module 130 may verify an amount of the packets sent during the time and may calculate a network bitrate using the verified amount of packets. For example, the transmission rate measurement module 130 may divide the sent amount of packets by the time and may designate the divided value as the network bitrate. In various embodiments, the transmission rate measurement module 130 may measure a packet round trip time (RTT) to measure a transmission rate of the network. For example, the transmission rate measurement module 130 may send a specific packet to the external electronic device 103 and may measure a time when a response packet (e.g., an acknowledge (ACK) packet) corresponding to reception of the packet is received from the external electronic device 103. However, a delay time by calculation or control and the like in the external electronic device 103 may be included in the packet RTT. Therefore, as described above, the transmission rate measurement module 130 may measure, for example, a transmission rate based on an amount of packets sent during a designated time.

The network state determination module 140 may determine a state of the communication network connected with the external electronic device 103. According to an embodiment, the network state determination module 140 may determine a state of the network based on the transmission rate of the network, measured through the transmission rate measurement module 130. For example, if the transmission rate is less than a specific level, the network state determination module 140 may determine that there is a large amount of traffic or congestion of the network. In various embodiments, the network state determination module 140 may determine a state of the network based on network information received from a server which manages the network. According to an embodiment, the network state determination module 140 may receive information about network handover and the like from a service provider or a base station which provides a network service and may determine a state of the network. According to various embodiments, in connection with a live broadcasting service, as viewers of a broadcast established by the electronic device 101 become congested, if data sent to the plurality of external electronic devices 103 are increased, the network state determination module 140 may determine that there is much traffic of the network.

The transmission control module 150 may control, for example, packet transmission. According to an embodiment, the transmission control module 150 may control packet transmission based on the extracted bitrate of the content and the measured network bitrate. For example, the transmission control module 150 may calculate the ratio of the bitrate of the content to the network bitrate and may set a transmission pause time and/or an additional transmission time of the packet transmission based on the calculated ratio value. The ratio value in which the ratio of the bitrate of the content to the network bitrate is calculated may be, for example, an index indicating how fast at least data for outputting the content is sent through the network. Therefore, when the calculated ratio value is higher, there may be more amounts of data which may be sent within a specific time.

In this regard, the transmission pause time may be, for example, a time when the electronic device 101 pauses to send a packet to the external electronic device 103. The electronic device 101 may reduce current consumption during the transmission pause time. Therefore, if the ratio value in which the ratio of the bitrate of the content to the network bitrate is calculated is greater than a specific value (e.g., two times), the transmission control module 150 may set the transmission pause time and may pause for the packet transmission. Also, when the ratio value is higher, the transmission control module 150 may set the transmission pause time to be longer or may set a packet transmission time or the additional transmission time to be shorter to frequently have the transmission pause time.

The additional transmission time may be, for example, a buffering time for guaranteeing stability of the communication network with the external electronic device 103. If the bitrate of the content is higher than the network throughput rate, the additional transmission time may be set shorter.

According to an embodiment, if the ratio of the content bitrate to the throughput rate is less than a specific factor (e.g., two times), the transmission control module 150 may not set the additional transmission time. For example, if the ratio value is less than the specific value, since the electronic device 101 is in an unstable state where the probability increases that an electric field will be insufficient to transmit at a particular bitrate, the transmission control module 150 may reduce or eliminate, altogether, additional transmission time and/or the transmission pause time to maintain packet transmission and not to enter a pause period of time.

According to various embodiments, the transmission control module 150 may transmit packets over the set transmission pause time and/or the set additional transmission time. According to an embodiment, the transmission control module 150 may sequentially align the transmission pause time and/or the additional transmission time at intervals of a specific time and may determine whether to send a packet in response to the aligned time. For example, the transmission control module 150 may stop transmitting packets during the packet pause time. Also, if the transmission pause time elapses, the transmission control module 150 may resume transmitting the packet. After continuing transmitting the packets during a designated time, the transmission control module 150 may maintain the packet transmission during the additional transmission time. Similarly, if the additional transmission time elapses, the transmission control module 150 may stop transmitting the packets during the transmission pause time. While repeating the above-mentioned operation, the transmission control module 150 may send packets to the external electronic device 103 to avoid abnormal operation upon executing content and may reduce current consumption.

According to various embodiments, the transmission control module 150 may set a transmit power function in a different way based on the temperature of the electronic device 101, determined through the heating state determination module 120. The heating state determination module 120 can comprise, for example, a thermometer. According to an embodiment, if the temperature is greater than a predetermined temperature, the transmission control module 150 may increase the transmission pause time or may decrease a supply power level of the transmitter. Alternatively, if the heating state/temperature is less than or equal to the temperature of the specific level, the transmission control module 150 may decrease the transmission pause time or may increase the supply power level of the transmitter. In this regard, the transmit power function may include a first transmit power function (or a high power function consuming more power) or a second transmit power function (or a low power function consuming less power). The first transmit power function may be set such that there is no transmission pause time of data or such that the transmission pause time of the data is shorter. Alternatively, the first transmit power function may be set such that the supply power level of the transmitter is higher. The second transmit power function may be set such that a transmission pause time is relatively higher than the first transmit power function. Alternatively, the second transmit power function may be set such that the supply power level of the transmitter is relatively lower than the first transmit power function. According to various embodiments, the transmit power function may further include functions, set by more combinations, other than the above-mentioned functions. For example, the transmit power function may further include a third transmit power function in which a transmission pause time is set to be relatively longer than the second transmit power function or in which a supply power level of the transmitter is set to be lower than the second transmit power function. Also, if power which remains in the electronic device 101 is power which is lower than a reference power value which is preset in the electronic device 101, the low power function may be performed. For example, if a battery (e.g., a battery 796 of FIG. 7) operatively connected to the electronic device 101 has less remaining power than a specific value or if the remaining power of the battery is within 15% of total power, the low power function may be performed. Also, for example, if the electronic device 101 is in a no power state (e.g., if the remaining power is substantially close to zero ('0' or '0%', commonly referred to as "dead") or if the battery is removed), the low power function may be performed. According to various embodiments, the transmission control module 150 may set the transmit power function in a different way based on a state of the network, determined through the network state determination module 140. According to an embodiment, as traffic of the network is increased, if a network transmission rate is less than or equal to a specific level, the transmission control module 150 may decrease the transmission pause time or may increase a supply power level of the transmitter. Alternatively, as traffic of the network is reduced, if a network transmission rate is greater than the specific level, the transmission control module 150 may increase the transmission pause time or may decrease a supply power level of the transmitter. According to various embodiments, if the temperature is normal (or is less than or equal to a specific temperature) or if a state of the network is congested (or if a network transmission rate is less than or equal to a specific level), the first transmit power function may be set. Also, if the temperature is hot or dangerously high (or is greater than the specific temperature, such that greater than the specific temperature can cause damage or malfunctioning by the electronic device) or if a state of the network is good (or if a network transmission rate is greater than the specific level), the second transmit power function may be set.

According to various embodiments, the electronic device 101 may further include a battery remaining capacity measurement module (not shown) which measures the remaining capacity of a battery (not shown) of the electronic device 101. If the remaining capacity of the battery measured based on the battery remaining capacity measurement module is less than or equal to a specific level, the electronic device 101 may set a transmit power function to the second transmit power function. For example, the electronic device 101 may increase the transmission pause time or may decrease the supply power level of the transmitter to reduce battery consumption. According to various embodiments, the electronic device 101 may further include a brightness measurement module (not shown) which measures a brightness level of an external environment. According to an embodiment, the brightness measurement module may include an illumination sensor and the like. The illumination sensor may measure an amount of light received from the outside of the electronic device 101 and may measure brightness of an external environment based on the measured amount of light. According to various embodiments, the electronic device 101 may reduce an image quality of the content in an environment which is relatively dark because a better image quality will not improve the user's experience. To reduce the image quality of the content may indicate that the bitrate of the content is relatively lower. Therefore, the electronic device 101 may set a transmit power function to the second transmit power function. Reducing the image quality can include, but is not limited to, reducing frame resolution (for example high-definition to standard definition), frame rate, reducing the color levels (such as reducing from 24-bit color to 16-bit or 8-bit color, or black and white), using fewer bits per pixel, and increasing quantization levels.

According to various embodiments, the electronic device 101 may further include a content image quality change module (not shown) which adjusts an image quality of the content. According to an embodiment, the content image quality change module may adjust the image quality of the content based on the remaining capacity of the battery. For example, the content image quality change module may adjust a bitrate of the content to adjust the image quality of the content. According to an embodiment, if the remaining capacity of the battery is less than or equal to a specific numeric value, the content image quality change module may reduce the image quality of the content. Therefore, the electronic device 101 (e.g., the transmission control module 150) may set a transmit power function to the second transmit power function.

According to various embodiments, the content image quality change module may adjust the image quality of the content based on the temperature. According to an embodiment, if the temperature is greater than a temperature of a specific level, the content image quality change module may reduce the image quality of the content. Therefore, the electronic device 101 (e.g., the transmission control module 150) may set a transmit power function to the second transmit power function.

According to various embodiments, the electronic device 101 (e.g., the transmission control module 150) may set a transmit power function in a different way based on complexity of the content. According to an embodiment, the electronic device 101 may set the transmit power function based on complexity of the content, measured through the content analysis module 110. For example, if the complexity of the content is low, the electronic device 101 may set the transmit power function to the second transmit power function. In certain embodiment, image and video can be coded using mathematical frequency transformations. The complexity of the image or video can be ascertained by examining the coefficients of higher frequency components.

According to various embodiments, the electronic device 101 (e.g., the transmission control module 150) may set the transmit power function in a different way by exchanging active information (e.g., network traffic related information, state information of the electronic device 101, and the like) with the external electronic device 103. According to an embodiment, the electronic device 101 may send its state information to the external electronic device 103 to request the external electronic device 103 to maintain a communication state where it is connecting with the external electronic device 103 or to increase a time assigned to the electronic device 101. In this case, the electronic device 101 may set the transmit power function to the first transmit power function. According to an embodiment, the electronic device 101 may receive network traffic related information and the like from the external electronic device 103 and may determine a state of the external electronic device 103. Also, the electronic device 101 may adjust the transmit power function based on the state of the external electronic device 103 to adjust a packet transmission rate.

According to various embodiments, if a second electronic device (not shown) (e.g., an action cam, a glass, or a wearable device and the like) which may operate by being paired with the electronic device 101 connects with the electronic device 101, the electronic device 101 (e.g., the transmission control module 150) may set the transmit power function in a different way based on the connected state. According to an embodiment, if the user broadcasts live based on an image captured through the second electronic device, the electronic device 101 may set the transmit power function based on a data rate through the connection. For example, if a speed at which a captured image is received from the second electronic device is relatively slower than a speed at which the image is transmitted to the external electronic device 103, the electronic device 101 may set the transmit power function to the second transmit power function.

According to various embodiments, the electronic device 101 (e.g., the transmission control module 150) may further use additional information in setting the transmit power function. For example, the electronic device 101 may set the transmit power function using handover information of the network and the remaining capacity of the battery.

According to various embodiments, the electronic device 101 (e.g., the transmission control module 150) may set only one of the transmit power functions. For example, the electronic device 101 may set only one of a data transmission time, a transmission pause time, or an additional transmission time. According to an embodiment, the electronic device 101 may increase the transmission pause time and may maintain the additional transmission time. Also, according to another embodiment, the electronic device 101 may maintain the transmission pause time and may decrease the additional transmission time. According to various embodiments, the electronic device 101 may set only a supply power level of the transmitter. For example, the electronic device 101 may not set the transmission pause time or the additional transmission time and the like and may set only the supply power level of the transmitter.

According to various embodiments, the electronic device 101 (e.g., the transmission control module 150) may change the transmit power function. According to an embodiment, the electronic device 101 may change the transmit power function from the first transmit power function to the second transmit power function or from the second transmit power function to the first transmit power function, based on at least one of heating information of its heating information or traffic information of a network connected with the external electronic device 103. For example, if a heating state/temperature changes to a specific temperature or less after it is greater than the specific temperature, the electronic device 101 may be changed from the second transmit power function to the first transmit power function. Alternatively, if the heating state/temperature changes from a state where it is less than or equal to the specific temperature to a state where it is greater than the specific temperature, the electronic device 101 may be changed from the first transmit power function to the second transmit power function.

According to various embodiments, the electronic device 101 (e.g., the transmission control module 150) may set a transmission time, a transmission pause time, or an additional transmission time and the like of the data in a different way based on the transmit power function. According to an embodiment, the electronic device 101 may stop transmitting data during a first transmission pause time in the first transmit power function and may stop transmitting data during a second transmission pause time in the second transmit power function. In various embodiments, the electronic device 101 may subdivide the transmission pause time to increase the number of pause periods of time. For example, the electronic device 101 may have pause periods of time a first number of times in the first transmit power function and may have pause periods of time a second number of times in the second transmit power function.

According to various embodiments, the electronic device 101 (e.g., the transmission control module 150) may change an operation function of at least one (e.g., a hardware module (or a hardware component), a software module (e.g., an operating system (OS) (or a platform), or an application program (or an application), and the like) of components included in the electronic device 101. According to an embodiment, the electronic device 101 may change a function of each of all or some of the components to a specific operation function (e.g., a power saving function) in the second transmit power function. For example, the electronic device 101 may change a function of each of a specific hardware component (e.g., an application processor (AP) or a communication processor (CP), a communication module (e.g., a radio frequency (RF) module), or a display, and the like) to a specific operation function (e.g., a low power function) in the second transmit power function.

According to various embodiments, the electronic device 101 (e.g., the transmission control module 150) may change the transmit power function based on a specific user input or a specific program routine. According to an embodiment, the electronic device 101 may change the transmit power function in response to a user input on a specific object (e.g., a notification bar) output on a screen (e.g., a menu screen). For example, if receiving a user input for selecting a transmit power function selection button included in the notification bar, the electronic device 101 may be changed to the selected transmit power function. Also, if the transmit power function is converted into the second transmit power function, the electronic device 101 may operate the OS using a specific operation function (e.g., a power saving function). According to another embodiment, the electronic device 101 may send a command, associated with the specific operation function (e.g., the power saving function), to the OS or the hardware component and the like based on a program routine included in a specific application while the specific application (e.g., a power management application) is executed.

The external electronic device 103 may be, for example, a device which may connect with the electronic device 101 through wired/wireless communication and may receive data from the electronic device 101. The external electronic device 103 may be a device having the same or similar configuration to the electronic device 101 or a device having a different configuration from the electronic device 101. According to an embodiment, the external electronic device 103 may be a server. For example, the external electronic device 103 may be a broadcast server which supports a live broadcasting service. In various embodiments, the external electronic device 103 may be an electronic device of another user. For example, the external electronic device 103 may be a receiving end terminal connected with the electronic device 101 through peer-to-peer communication. In this case, the external electronic device 103 may perform an output function for executing content corresponding to received packets, as well as a communication function for receiving packets from the electronic device 101.

According to various embodiments, the electronic device 101 may determine that it moves to a communication congestion area, through handover information of a network. According to an embodiment, the external electronic device 103 may be a network service provider or a base station and the like. In this case, the external electronic device 103 may send network congestion prediction information, determined based on the handover information, to the electronic device 101 located in a service area of the external electronic device 103. Therefore, the electronic device 101 may set a transmit power function based on the network congestion prediction information. According to an embodiment, if the electronic device 101 moves from an area where communication congestion is high to an area where the communication congestion is low, it may set the transmit power function to the second transmit power function.

According to various embodiments, if the user uses a live broadcasting service, the electronic device 101 may set the transmit power function based on the number of viewers (or connectors) of the live broadcast. According to an embodiment, the external electronic device 103 may be a broadcast server which supports a live broadcasting service. In this case, the external electronic device 103 may send the number of the viewers of the live broadcast to the electronic device 101. Therefore, if the number of the viewers is rapidly increased, since traffic of the broadcast server is congested, the electronic device 101 may set the transmit power function to the first transmit power function.

As described above, according to various embodiments, a portable electronic device may include a communication interface, a memory configured to store multimedia data obtained through at least one camera operatively connected with the memory, and a processor. The processor may be configured to transmit at least part of the multimedia data to an external electronic device through a network using a first transmit power function of the portable electronic device, through the communication interface, to determine context information associated with at least one of the portable electronic device and the network, and to change the first transmit power function to a second transmit power function of the portable electronic device if the context information corresponds to a specific condition.

According to various embodiments, the context information may include at least one of heating information of the portable electronic device and traffic information of the network. The processor may be configured to select at least one of the first transmit power function and the second transmit power function by setting at least one of a transmission time of the multimedia data and a transmit power of the multimedia data, based on the context information.

According to various embodiments, the portable electronic device may further include at least one camera configured to obtain at least part of the multimedia data.

According to various embodiments, the multimedia data may include video data.

According to various embodiments, the processor may be configured to receive at least part of the multimedia data from another external electronic device different from the external electronic device.

According to various embodiments, the portable electronic device may further include another communication interface, different from the communication interface, for receiving the at least part of the multimedia data from the another external electronic device different from the external electronic device.

According to various embodiments, the setting of the transmission time of the multimedia data may include setting at least one of a transmission time of the multimedia data, a transmission pause time of the multimedia data, and an additional transmission time of the multimedia data. The setting of the transmit power of the multimedia data may include setting a supply power level of a transmitter which transmits the multimedia data.

According to various embodiments, if heating information of the portable electronic device is less than or equal to a designated value, the processor may be configured to set a current transmit power function to the first transmit power function which has at least one of the transmission pause time of a first length and a first number of times and the supply power level of a first level. If the heating information of the portable electronic device is greater than the designated value, the processor may be configured to set the current transmit power function to the second transmit power function which has at least one of the transmission pause time of a second length and a second number of times and the supply power level of a second level.

According to various embodiments, if the heating information of the portable electronic device is changed from less than or equal to the designated value to greater than the designated value, the processor is configured to change the first transmit power function to the second transmit power function. If the heating information of the portable electronic device is changed from greater than the designated value to less than or equal to the designated value, the processor is configured to change the second transmit power function to the first transmit power function.

According to various embodiments, the processor may be configured to select at least one of the first transmit power function and the second transmit power function based on a ratio value in which the ratio of a bitrate of the multimedia data to a bitrate of the network is calculated.

According to various embodiments, if the ratio value is less than or equal to a designated ratio value, the processor may be configured to set a current transmit power function to the first transmit power function which has at least one of the transmission pause time of a first length and a first number of times and the supply power level of a first level. If the ratio value is greater than the designated ratio value, the processor may be configured to set the current transmit power function to the second transmit power function which has at least one of the transmission pause time of a second length and a second number of times and the supply power level of a second level.

According to various embodiments, if the ratio value is changed from less than or equal to the designated ratio value to greater than the designated ratio value, the processor is configured to change the first transmit power function to the second transmit power function. If the ratio value is changed from greater than the designated ratio value to less than or equal to the designated ratio value, the processor is configured to change the second transmit power function to the first transmit power function.

Figure 2:
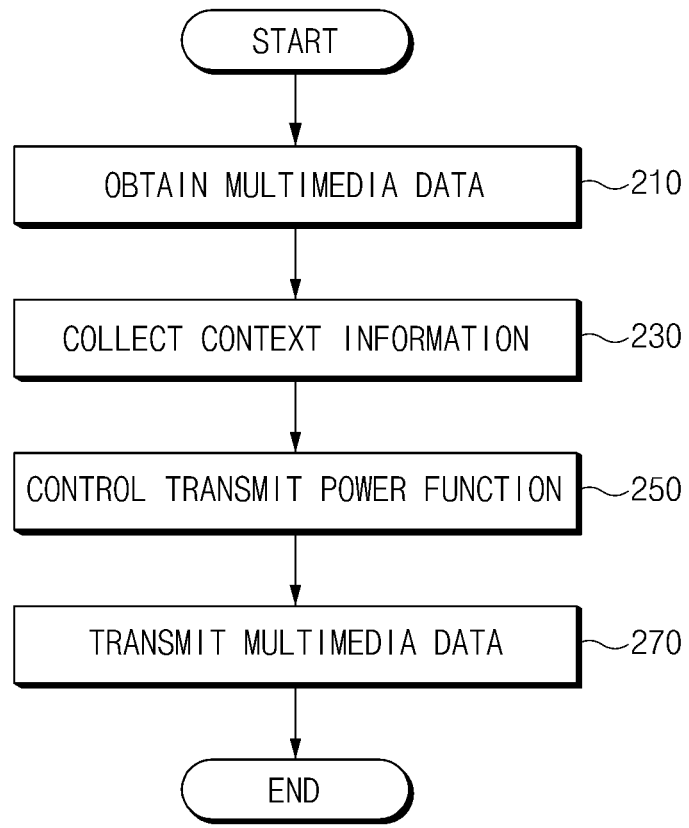
FIG. 2 is a flowchart illustrating an operation method of an electronic device associated with controlling content transmission according to various embodiments.

FIG. 2 is a flowchart illustrating an operation method of an electronic device associated with controlling content transmission according to various embodiments.

Referring to FIG. 2, in operation 210, the electronic device (e.g., an electronic device 101 of FIG. 1) may obtain multimedia data to be transmitted to an external electronic device (e.g., an external electronic device 103 of FIG. 1). According to an embodiment, the electronic device may obtain an image, video, or audio/video captured in real time through a camera operatively connected with the electronic device, as multimedia data like a live broadcasting service. According to various embodiments, the electronic device may obtain at least part of the multimedia data from a second external electronic device different from the external electronic device. For example, the electronic device may obtain the multimedia data from the second external electronic device which may operate by being pairing with the electronic device. The second external electronic device may include, for example, an action cam, a glass, or a wearable device and the like.

In operation 230, the electronic device may collect its heating information/temperature or traffic information of a network/network congestion connected with the external electronic device. According to an embodiment, the electronic device may collect the heating information based on its temperature sensor/thermometer. For example, the electronic device may measure its amount of heating based on the temperature sensor which is disposed to be adjacent to the battery or a communication processor (or a communication chip) associated with data communication. According to various embodiments, the electronic device may verify an amount of packets sent during a designated time and may collect the traffic information. Alternatively, the electronic device may collect information (e.g., handover information) of the network from a server (e.g., a network service provider or a base station and the like) which manages the network and may collect the traffic information based on the information of the network.

In operation 250, the electronic device may control a transmit power function. According to various embodiments, the electronic device may set a transmission time of the data, a transmission pause time of the data, or an additional transmission time of the data, and the like. Alternatively, the electronic device may set a supply power level of a transmitter which transmits the data. According to an embodiment, if the heating information is less than or equal to a specific value, the electronic device may set the transmission pause time to a specific time or more. Also, the electronic device may increase a supply power level of the transmitter. According to various embodiments, if the heating information is greater than the specific value, the electronic device may set the transmission pause time to less than the specific time. According to various embodiments, the electronic device may subdivide the transmission pause time to increase the number of transmission pause periods of time. Also, the electronic device may decrease a supply power level of the transmitter.

According to various embodiments, if congestion of the traffic is greater than a specific level, the electronic device may decrease the transmission pause time. Also, the electronic device may enhance a supply power level of the transmitter. According to various embodiments, if the congestion of the traffic is less than or equal to the specific level, the electronic device may increase the transmission pause time. Also, the electronic device may decrease the supply power level of the transmitter.

According to various embodiments, the electronic device may change a setting of the transmission time or a setting of the supply power level of the transmitter, and the like. According to an embodiment, if the heating information is changed from a state where it is less than or equal to the specific value to a state where it is greater than the specific value, the electronic device may change the transmission pause time to be relatively longer than a specific time. Also, the electronic device may change a supply power level of the transmitter to a level which is relatively lower than a specific level. According to another embodiment, if the heating information is changed from the state where it is greater than the specific value to the state where it is less than or equal to the specific value, the electronic device may change the transmission pause time to be relatively shorter than the specific time. Also, the electronic device may change a supply power level of the transmitter to a level which is relatively higher than the specific level.

In operation 270, the electronic device may send the multimedia data. According to an embodiment, the electronic device may send the multimedia data to the external electronic device using the transmit power function set in operation 250. For example, the electronic device may pause to send the multimedia data in the transmission pause time.

Figure 3:
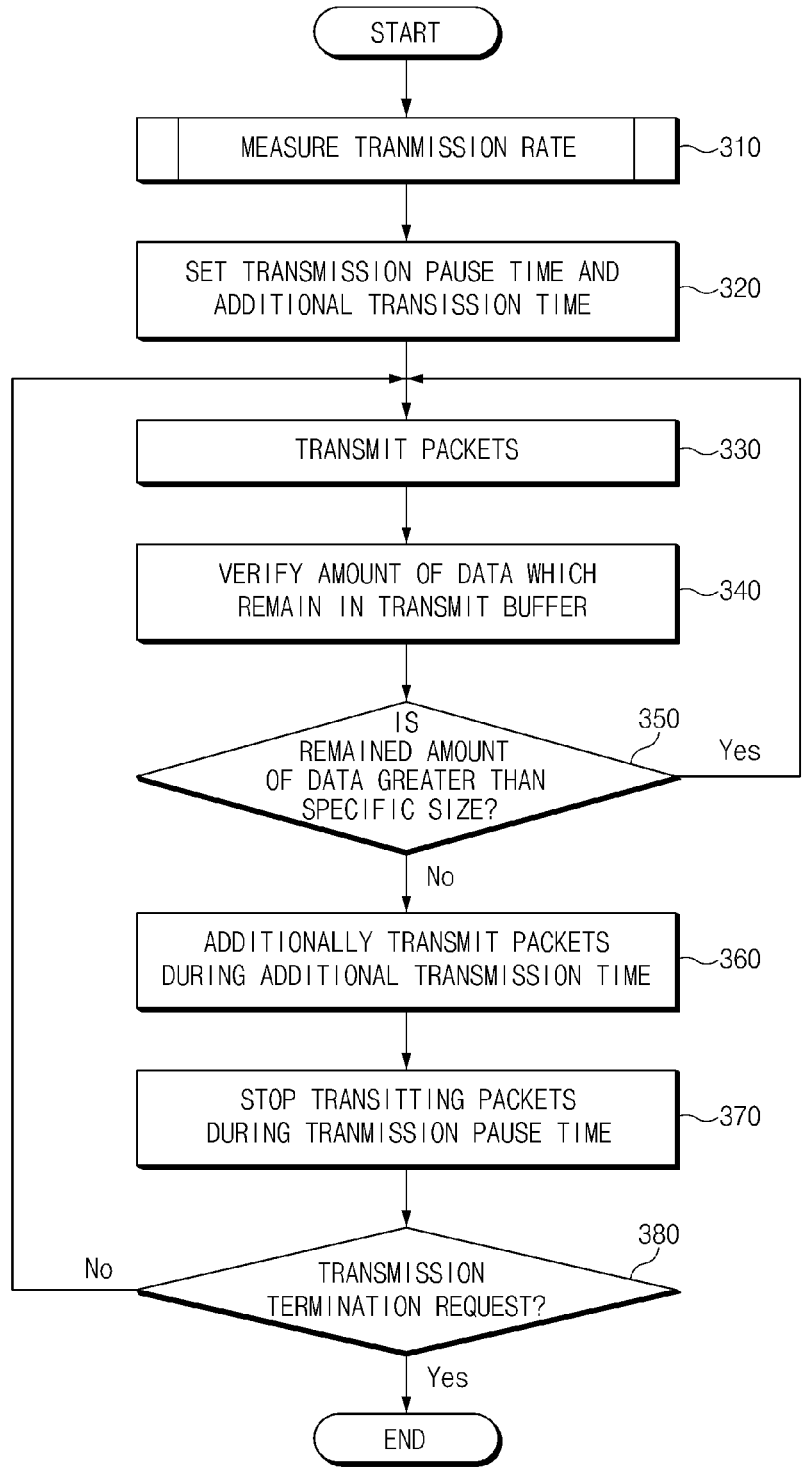
FIG. 3 is a flowchart illustrating an operation method of an electronic device associated with controlling content transmission using a bitrate of content and a bitrate of a network according to various embodiments.

FIG. 3 is a flowchart illustrating an operation method of an electronic device associated with controlling content transmission using a bitrate of content and a bitrate of a network according to various embodiments.

Referring to FIG. 3, in operation 310, the electronic device (e.g., an electronic device 101 of FIG. 1) may measure a transmission rate of a network connected with an external electronic device (e.g., an external electronic device 103 of FIG. 1). According to an embodiment, the electronic device may transmit packets to the external electronic device during a designated time and may calculate a bitrate of the network based on the time and the transmitted amount of packets. Also, the electronic device may extract a bitrate (or a data throughput (or a transmission amount) per unit time) from content (e.g., multimedia data) to be sent to the external electronic device. According to an embodiment, the electronic device may extract a bitrate of the content from meta information (or header information) of the content.

In operation 320, the electronic device may control, for example, a transmit power function associated with setting a transmission time of packets or setting a transmit power of the packets based on the bitrate of the network and the bitrate of the content. According to an embodiment, the electronic device may set a transmission pause time and an additional transmission time. According to an embodiment, the electronic device may calculate the ratio of the bitrate of the content to the bitrate of the network and may set the transmission pause time and the additional transmission time based on the calculated ratio value. According to various embodiments, if the ratio value is less than or equal to a specific value (e.g., two times), the electronic device may not set the transmission pause time or the additional transmission time. In this case, the electronic device may continuously perform packet transmission without a pause period of time. According to various embodiments, the electronic device may perform operation 310 and operation 320 at intervals of a designated time. Therefore, the electronic device may determine a network state at the intervals of the designated time, may set the transmission pause time and the additional transmission time, and may control packet transmission.

In operation 330, the electronic device may send, for example, packets to the external electronic device. For example, the electronic device may divide data in units of packets in a buffer (e.g., a transmit buffer) which stores content to be transmitted and may transmit the divided data to the external electronic device. In operation 340, the electronic device may verify an amount of data which remain in the buffer. For example, the electronic device may determine how much data to be transmitted to the external electronic device remains.

In operation 350, the electronic device may determine, for example, whether an amount of data which remains in the buffer is greater than a specific size (e.g., a threshold value). According to an embodiment, the electronic device may set the specific size to a zero value. For example, the electronic device may determine whether the buffer is currently empty. In various embodiments, the electronic device may designate the specific size as a value in which a designated time is multiplied by a bitrate of content to be transmitted to the external electronic device.

According to various embodiments, if the amount of data which remain in the buffer is greater than the specific size, the electronic device may return to operation 330. For example, the electronic device may send a packet corresponding to the data which remain in the buffer. Also, the electronic device may repeatedly perform operations 330 to 350 to transmit packets until the data which remain in the buffer are less than or equal to the specific size.

According to various embodiments, if the amount of data which remain in the buffer are less than or equal to the specific size, in operation 360, the electronic device may additionally transmit packets during the additional transmission time. For example, the electronic device may send the packets during the additional transmission time to guarantee the stability of the network.

In operation 370, for example, the electronic device may stop transmitting packets during the transmission pause time. For example, the electronic device may store data in the transmit buffer during the transmission pause time without sending the data to the external electronic device. Therefore, the electronic device may reduce current consumption during the transmission pause time.

In operation 380, the electronic device may determine, for example, whether a request to terminate transmission of the content is received. According to an embodiment, if the transmission of the content is completed, the electronic device may terminate packet transmission based to the request to terminate the transmission. Alternatively, if the content is a continuously captured image like a live broadcasting service, the electronic device may receive a transmission termination request and may terminate packet transmission when the broadcasting service is ended.

According to various embodiments, if the request to terminate the transmission of the content is not received, for example, the electronic device may return to operation 330 and may resume transmitting packets. Alternatively, for example, the electronic device may return to operation 310 and may measure a transmission rate of a network connected with the external electronic device again. Therefore, the electronic device may adaptively respond to for example, a transmission rate of a variable network, may set the transmission pause time and the additional transmission time, and control packet transmission based on the set time.

In FIG. 3, the electronic device may perform an operation of determining a transmission termination request in operation 380 after the operation of stopping transmitting the packets during the transmission pause time. However, embodiments of the present invention are not limited thereto. For example, the transmission termination request may be substantially received as an input signal for ending a network connection, a broadcasting service, or the electronic device. According to an embodiment, the electronic device may receive the input signal in an interrupt way. In this case, the electronic device may perform the same or similar operation to operation 380 anytime while an operation routine associated with controlling the packet transmission is performed to terminate the packet transmission.

Figure 4:
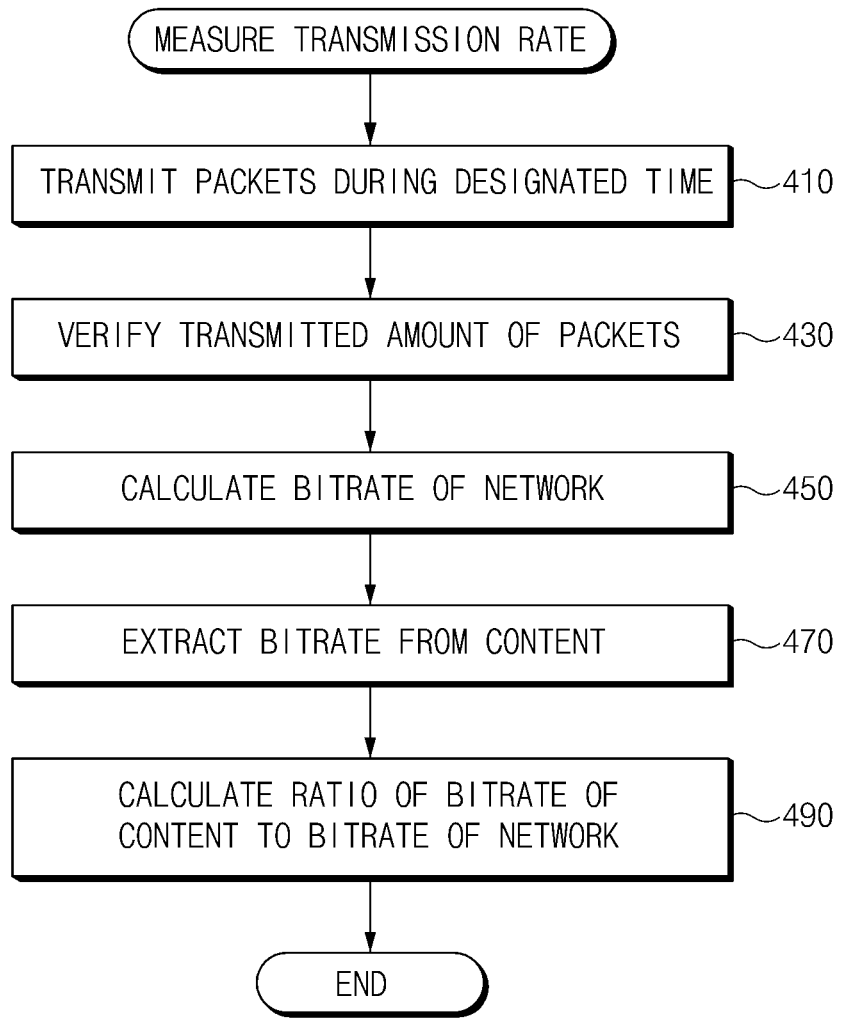
FIG. 4 is a flowchart illustrating an operation method of an electronic device associated with measuring a network transmission rate according to various embodiments.

FIG. 4 is a flowchart illustrating an operation method of an electronic device associated with measuring a network transmission rate according to various embodiments.

Referring to FIG. 4, in operation 410, the electronic device (e.g., an electronic device 101 of FIG. 1) may transmit packets during a designated time in response to a request to measure a transmission rate of a network connected with an external electronic device (e.g., an external electronic device 103 of FIG. 1). According to an embodiment, the electronic device may send at least one packet, in which content to be sent to the external electronic device is divided to a designated size, during the designated time.

In operation 430, the electronic device may verify, for example, an amount of packets (or the number of the packets) transmitted during the designated time. Also, the electronic device may calculate an amount of data transmitted during the designated time by multiplying the transmitted amount of packets by a size of the packets.

In operation 450, the electronic device may calculate, for example, a bitrate of the network. According to an embodiment, the electronic device may calculate the bitrate of the network by dividing the transmitted amount of data by the designated time. Therefore, the electronic device may determine the number of packets which may be sent to the external electronic device, connected through the network, during a specific time.

In operation 470, the electronic device may extract a bitrate (or a data throughput (or a data transmission amount) per unit time) from content (e.g., multimedia data) to be sent to the external electronic device. According to an embodiment, the electronic device may extract the bitrate from meta information of the content. According to various embodiments, if a bitrate of an image to be sent is specified like a live broadcasting service by an external input (e.g., a user input), the electronic device may omit the performance of operation 470 and may use the specified bitrate. According to various embodiments, the electronic device may perform operation 470 before performing the operations (e.g., operations 410 to 450) for calculating the bitrate of the network or at the same time as performing the operations.

In operation 490, the electronic device may calculate, for example, the ratio of the bitrate of the content to the bitrate of the network. The calculated ratio value may be used as an index indicating how fast at least data for outputting the content are sent through the network. Therefore, the electronic device may determine a transmission rate of the network based on the calculated ratio value.

As described above, according to various embodiments, a method for controlling content transmission in a portable electronic device may include obtaining multimedia data through at least one camera operatively connected with the portable electronic device, collecting context information associated with at least one of the portable electronic device and a network connected with an external electronic device through a communication interface of the portable electronic device, selecting a transmit power function of the portable electronic device, by setting at least one of a transmission time of the multimedia data and a transmit power of the multimedia data, based in part on the context information, and transmitting the multimedia data using the transmit power function.

According to various embodiments, the obtaining of the multimedia data may include receiving at least part of the multimedia data from another external electronic device different from the external electronic device.

According to various embodiments, the setting of the transmission time of the multimedia data may include setting at least one of a transmission time of the multimedia data, a transmission pause time of the multimedia data, and an additional transmission time of the multimedia data, and the setting of the transmit power of the multimedia data may include setting a supply power level of a transmitter which transmits the multimedia data.

According to various embodiments, the method may further include extracting a bitrate from the multimedia data, measuring a transmission rate of the network, thereby resulting in a bitrate of the network, calculating a ratio value, in which the ratio of the bitrate of the multimedia data to the bitrate of the network is calculated, selecting the transmit power function based on the ratio value, and transmitting the multimedia data using the transmit power function.

According to various embodiments, the transmitting of the multimedia data may include continuously transmitting portions of the multimedia data until a first time when an amount of data which remains in a buffer associated with transmitting the multimedia data is less than or equal to a threshold.

According to various embodiments, the transmitting of the multimedia data may further include additionally transmitting at least another portion of the multimedia data for a second time after the first time.

According to various embodiments, the method may further include measuring the transmission rate of the network again after the first time or the second time, thereby resulting in another bitrate of the network, calculating another ratio value, in which the ratio of the bitrate of the multimedia data to the another bitrate of the network is calculated, and selecting the transmit power function based on the another ratio value.

According to various embodiments, the additionally transmitting of the at least another portion of the multimedia data for the second time may include measuring the transmission rate of the network again if a condition that the amount of data which remains in the buffer is greater than the threshold continues for a designated time within the second time, thereby resulting in another bitrate of the network, calculating another ratio value, in which the ratio of the bitrate of the multimedia data to the another bitrate of the network is calculated, and selecting the transmit power function based on the another ratio value.

According to various embodiments, the selecting of the transmit power function may include at least one of setting a current transmit power function to a first transmit power function which has at least one of the transmission pause time of a first length and a first number of times and the supply power level of a first level, if the ratio value is less than or equal to a designated ratio value, setting the current transmit power function to a second transmit power function which has at least one of the transmission pause time of a second length and a second number of times and the supply power level of a second level, if the ratio value is greater than the designated ratio value, changing the first transmit power function to the second transmit power function, if the ratio value is changed from less than or equal to the designated ratio value to greater than the designated ratio value, and changing the second transmit power function to the first transmit power function, if the ratio value is changed from greater than the designated ratio value to less than or equal to the designated ratio value.

Figure 5:
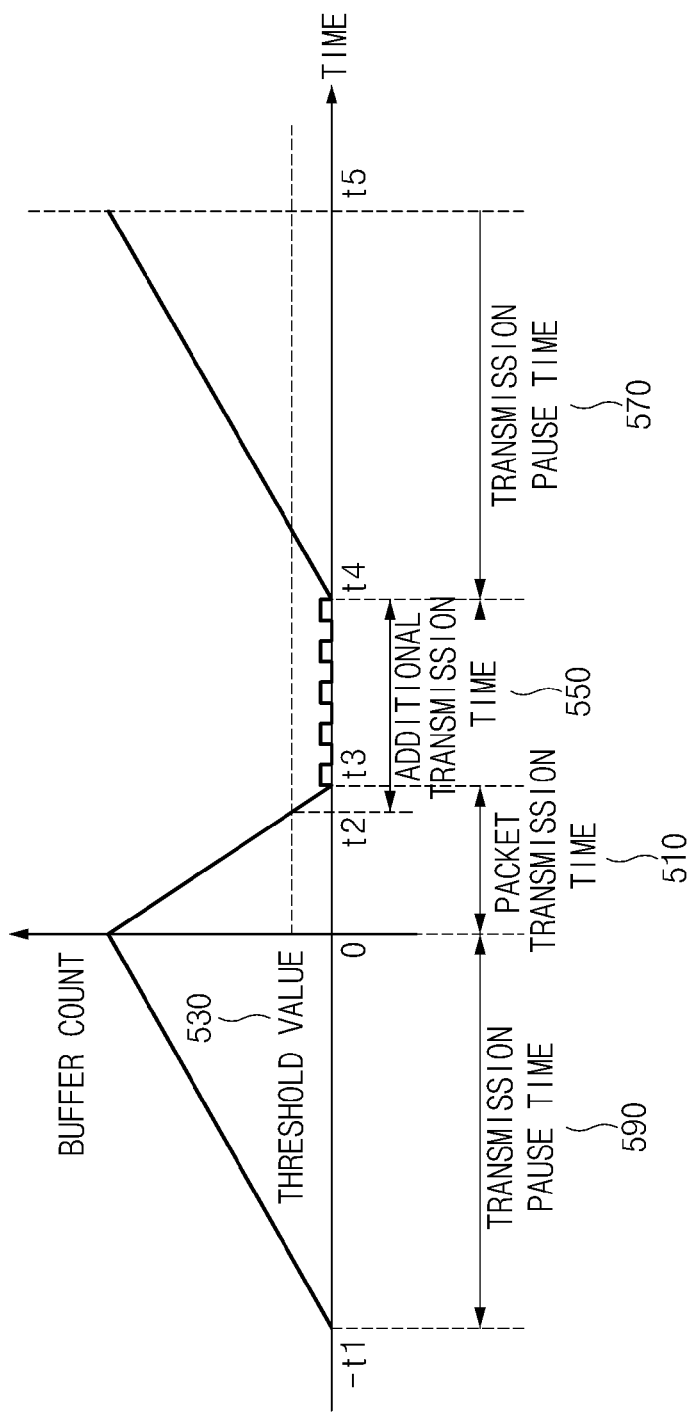
FIG. 5 is a graph illustrating buffer count by content transmission control according to various embodiments.

FIG. 5 is a graph illustrating buffer count by content transmission control according to various embodiments.

Referring to FIG. 5, an electronic device (e.g., an electronic device 101 of FIG. 1) may transmit data, stored in a buffer, in units of packets during a packet transmission time 510. The buffer may include, for example, a transmit buffer. According to various embodiments, the packet transmission time 510 may refer to a time from a time 0 to start to transmit a packet to an initial time t3 when the data stored in the buffer doe not remain in the buffer. For example, the electronic device may transmit all of the data stored in the buffer during the packet transmission time 510. In various embodiments, the electronic device may set the packet transmission time 510 to a time from the time 0 to start to transmit the packet to an initial time t2 when an amount of data which remain in the buffer is less than or equal to a specific size (e.g., a threshold value 530).

According to various embodiments, the electronic device may change the threshold value 530. For example, the electronic device may change the threshold value 530 based on an external input (e.g., a user input) or a type of a network (e.g., a 3 generation (3G) or 4G network).

According to various embodiments, the electronic device may additionally transmit packets during an additional transmission time 550 set from the initial time t2 when the amount of data which remain in the buffer is less than or equal to the specific size. As shown in FIG. 5, if data is stored in the buffer, the electronic device may transmit the stored data in units of packets and may monitor the buffer until data is stored in the buffer if there is no data in the buffer. However, FIG. 5 illustrates a transmission state in a general situation. In various embodiments, since a transmission state of a network is changed (or bad) during the additional transmission time 550, an amount of data stored in the transmit buffer is greater than the specific size. In this case, the electronic device may measure a transmission rate of the network again and may reset the additional transmission time 550 and/or a transmission pause time 570.

According to various embodiments, the electronic device may pause to transmit packets during the transmission pause time 570 from a time t4 when the additional transmission time 550 elapses. Also, the electronic device may resume transmitting packets from a time t5 when the transmission pause time 570 elapses and may repeatedly perform the above-mentioned operations.

According to various embodiments, the electronic device may measure a transmission rate of the network during the packet transmission time 510 or the additional transmission time 550. Therefore, the electronic device may set an additional transmission time and/or a transmission pause time which is subsequently performed. This is to adaptively correspond based on a transmission state of the network. Therefore, a transmission pause time 590 (e.g., the first transmission pause time 590) before the packet transmission time 510 is set to be different from the transmission pause time 570 (e.g., the second transmission pause time 570) after the packet transmission time 510. For example, a length from a time—t1 when the first transmission pause time 590 is started to the time 0 to start to transmit the packet may be different from a length from the time t4 when the additional transmission time 550 elapses to the time t5 when the second transmission pause time 570 is started. According to various embodiments, the electronic device may subdivide a transmission pause time to increase the number of pause periods of time. For example, the electronic device may divide the transmission pause time into a plurality of transmission pause times, may arrange a packet transmission time between the divided transmission pause times, and may repeat the packet transmission time and the transmission pause time during a short time. Also, the electronic device may subdivide each of the transmission pause times to a different length or a different number of times. For example, the electronic device may set at least one of a length of the first transmission pause time 590 and a length of the second transmission pause time 570 or the number of times of the first transmission pause time 590 and the number of times of the second transmission time 570 in a different way.

Figure 6:
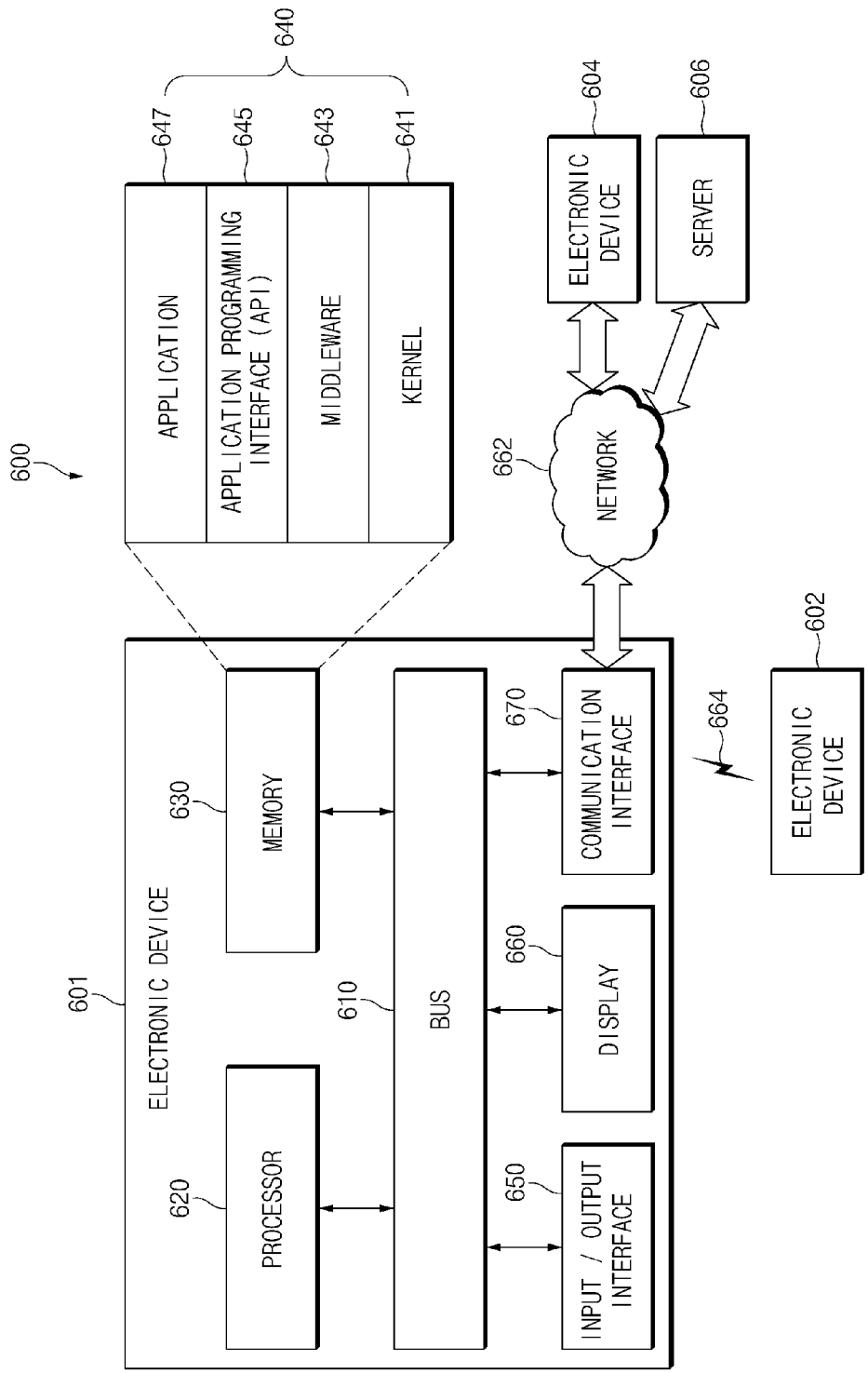
FIG. 6 is a block diagram illustrating a configuration of an electronic device in a network environment according to various embodiments.

FIG. 6 is a block diagram illustrating a configuration of an electronic device 601 in a network environment 600 according to various embodiments.

Referring to FIG. 6, the electronic device 601 may include a bus 610, a processor 620, a memory 630, an input and output interface 650, a display 660, and a communication interface 670. In various embodiments, at least one of the components of the electronic device 601 may be omitted from the electronic device 601, and other components may be additionally included in the electronic device 601.

The bus 610 may include, for example, a circuit which connects the components 620 to 670 with each other and sends a communication signal (e.g., a control message and/or data) between the components 620 to 670.

The processor 620 may include one or more of a central processing unit (CPU), an application processor (AP), or a communication processor (CP). The processor 620 may perform, for example, calculation or data processing about control and/or communication of at least another of the components of the electronic device 601.

The memory 630 may include a volatile and/or non-volatile memory. The memory 630 may store, for example, a command or data associated with at least another of the components of the electronic device 601. According to an embodiment, the memory 630 may software and/or a program 640. The program 640 may include, for example, a kernel 641, a middleware 643, an application programming interface (API) 645, and/or at least one application program 647 (or "at least one application"), and the like. At least part of the kernel 641, the middleware 643, or the API 645 may be referred to as an operating system (OS).

The kernel 641 may control or manage, for example, system resources (e.g., the bus 610, the processor 620, or the memory 630, and the like) used to execute an operation or function implemented in the other programs (e.g., the middleware 643, the API 645, or the application program 647). Also, as the middleware 643, the API 645, or the application program 647 accesses a separate component of the electronic device 601, the kernel 641 may provide an interface which may control or manage system resources.

The middleware 643 may play a role as, for example, a go-between such that the API 645 or the application program 647 communicates with the kernel 641 to communicate data with the kernel 641.

Also, the middleware 643 may process one or more work requests, received from the application program 647, in order of priority. For example, the middleware 643 may assign priority which may use system resources (the bus 610, the processor 620, or the memory 630, and the like) of the electronic device 601 to at least one of the at least one application program 647. For example, the middleware 643 may perform scheduling or load balancing for the one or more work requests by processing the one or more work requests in order of priority assigned to the at least one of the at least one application program 647.

The API 645 may be, for example, an interface in which the application program 647 controls a function provided from the kernel 641 or the middleware 643. For example, the API 645 may include at least one interface or function (e.g., instruction) for file control, window control, image processing, or text control, and the like.

The input and output interface 650 may play a role as, for example, an interface which may send a command or data, input from a user or another external device, to another component (or other components) of the electronic device 601. Also, the input and output interface 650 may output a command or data, received from another component (or other components) of the electronic device 601, to the user or the other external device.

The display 660 may include, for example, a liquid crystal display (LCD), a light emitting diode (LED) display, an organic LED (OLED) display, a microelectromechanical systems (MEMS) display, or an electronic paper display. The display 660 may display, for example, a variety of content (e.g., text, images, videos, icons, or symbols, and the like) to the user. The display 660 may include a touch screen, and may receive, for example, a touch, a gesture, proximity, or a hovering input using an electronic pen or part of a body of the user.

The communication interface 670 may establish communication between, for example, the electronic device 601 and an external device (e.g., a first external electronic device 602, a second external electronic device 604, or a server 606). For example, the communication interface 670 may connect to a network 662 through wireless communication or wired communication and may communicate with the external device (e.g., the second external electronic device 604 or the server 606).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 664. The local-area communication 664 may include, for example, at least one of wireless-fidelity (Wi-Fi) communication, Bluetooth (BT) communication, near field communication (NFC) communication, or global navigation satellite system (GNSS) communication, and the like. The GNSS may include, for example, at least one of a global positioning system (GPS), a Glonass, a Beidou navigation satellite system (hereinafter referred to as "Beidou"), or a Galileo (i.e., the European global satellite-based navigation system). Hereinafter, the "GPS" used herein may be interchangeably with the "GNSS". The wired communication may include, for example, at least one of universal serial bus (USB) communication, high definition multimedia interface (HDMI) communication, recommended standard 232 (RS-232) communication, power line communication, or plain old telephone service (POTS) communication, and the like. The network 662 may include a telecommunications network, for example, at least one of a computer network (e.g., a local area network (LAN) or a wide area network (WAN)), the Internet, or a telephone network.

Each of the first and second external electronic devices 602 and 604 may be the same as or different device from the electronic device 601. According to an embodiment, the server 606 may include a group of one or more servers. According to various embodiments, all or some of operations executed in the electronic device 601 may be executed in another electronic device or a plurality of electronic devices (e.g., the first external electronic device 602, the second external electronic device 604, or the server 606). According to an embodiment, if the electronic device 601 should perform any function or service automatically or according to a request, it may request another device (e.g., the first external electronic device 602, the second external electronic device 604, or the server 606) to perform at least part of the function or service, rather than executing the function or service for itself or in addition to the function or service. The other electronic device (e.g., the first external electronic device 602, the second external electronic device 604, or the server 606) may execute the requested function or the added function and may transmit the executed result to the electronic device 601. The electronic device 601 may process the received result without change or additionally and may provide the requested function or service. For this purpose, for example, cloud computing technologies, distributed computing technologies, or client-server computing technologies may be used.

In certain embodiments, the content analysis module 110, heating state determination module 120, transmission rate measurement module 130, network state determination module 140, and transmission control module 150 can be implemented as executable instructions stored in the memory 630. When the processor 620 executes the instructions, the processor and other components of the electronic device 601 perform any of the various operations described herein. The communication interface 670 can operated according to the first transmit power function or the second transmit power function.

Figure 7:
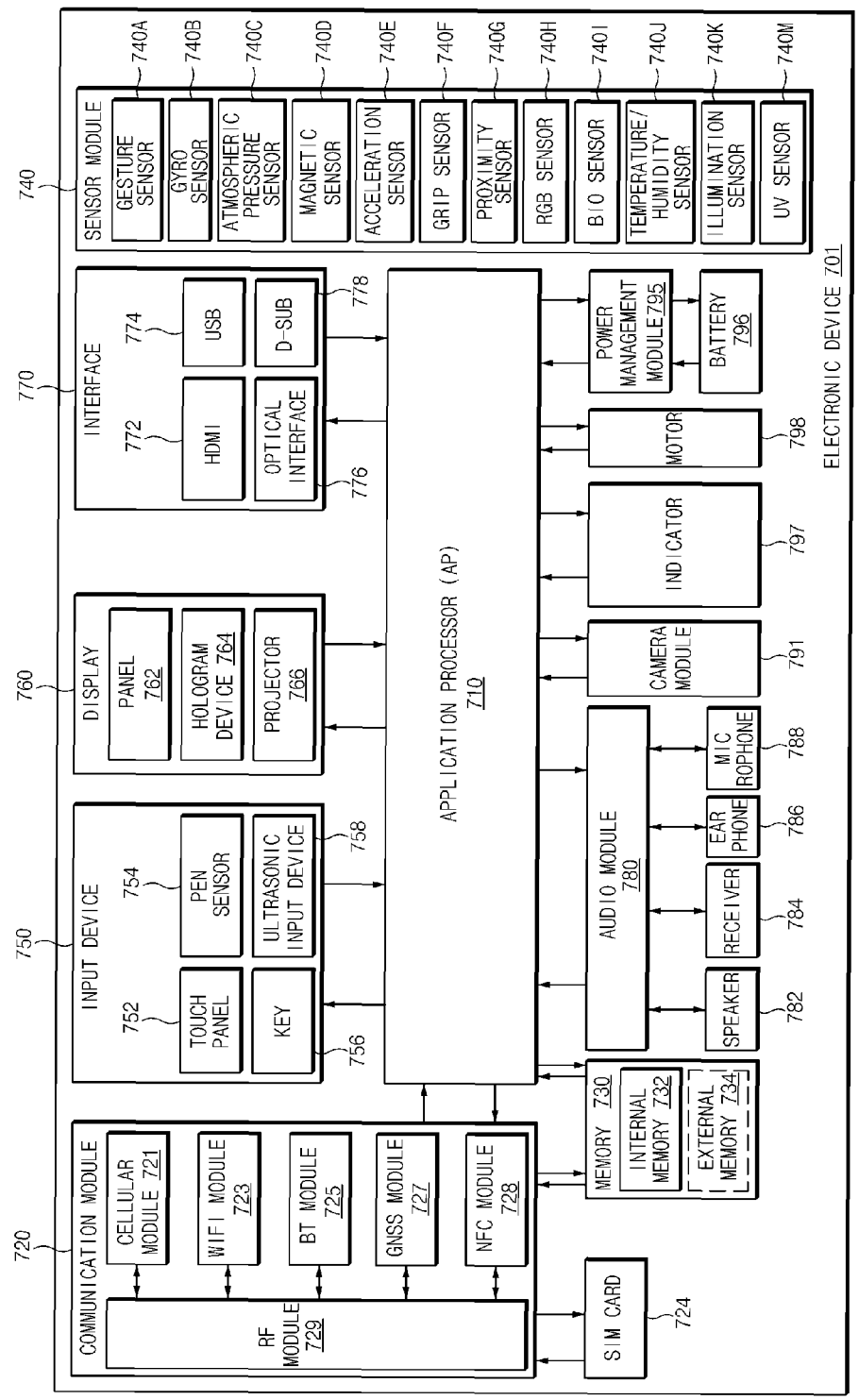
FIG. 7 is a block diagram illustrating a configuration of an electronic device according to various embodiments.

FIG. 7 is a block diagram illustrating a configuration of an electronic device according to various embodiments. Referring to FIG. 7, an electronic device 701 may include, for example, all or part of an electronic device 601 shown in FIG. 6. The electronic device 701 may include one or more processors 710 (e.g., application processors (APs)), a communication module 720, a subscriber identification module (SIM) 724, a memory 730, a sensor module 740, an input device 750, a display 760, an interface 770, an audio module 780, a camera module 791, a power management module 795, a battery 796, an indicator 797, and a motor 798.

The processor 710 may execute, for example, an operating system (OS) or an application program to control a plurality of hardware or software components connected thereto and may process and compute a variety of data. The processor 710 may be implemented with, for example, a system on chip (SoC). According to an embodiment, the processor 710 may include a graphic processing unit (GPU) (not shown) and/or an image signal processor (not shown). The processor 710 may include at least some (e.g., a cellular module 721) of the components shown in FIG. 7. The processor 710 may load a command or data, received from at least one of other components (e.g., a non-volatile memory), to a volatile memory to process the data and may store various data in a non-volatile memory.

The communication module 720 may have the same or similar configuration to a communication interface 670 of FIG. 6. The communication module 720 may include, for example, the cellular module 721, a wireless-fidelity (Wi-Fi) module 723, a Bluetooth (BT) module 725, a global navigation satellite system (GNSS) module 727 (e.g., a GPS module, a Glonass module, a Beidou module, or a Galileo module), a near field communication (NFC) module 728, and a radio frequency (RF) module 729.

The cellular module 721 may provide, for example, a voice call service, a video call service, a text message service, or an Internet service, and the like through a communication network. According to an embodiment, the cellular module 721 may identify and authenticate the electronic device 701 in a communication network using a SIM 724 (e.g., a SIM card). According to an embodiment, the cellular module 721 may perform at least some of functions which may be provided by the processor 710. According to an embodiment, the cellular module 721 may include a communication processor (CP).

The Wi-Fi module 723, the BT module 725, the GNSS module 727, or the NFC module 728 may include, for example, a processor for processing data communicated through the corresponding module. According to various embodiments, at least some (e.g., two or more) of the cellular module 721, the Wi-Fi module 723, the BT module 725, the GNSS module 727, or the NFC module 728 may be included in one integrated chip (IC) or one IC package.

The RF module 729 may communicate, for example, a communication signal (e.g., an RF signal). Though not shown, the RF module 729 may include, for example, a transceiver, a power amplifier module (PAM), a frequency filter, or a low noise amplifier (LNA), or an antenna, and the like. According to another embodiment, at least one of the cellular module 721, the Wi-Fi module 723, the BT module 725, the GNSS module 727, or the NFC module 728 may communicate an RF signal through a separate RF module.

The SIM 724 may include, for example, a card which includes a SIM and/or an embedded SIM. The SIM 724 may include unique identification information (e.g., an integrated circuit card identifier (ICCID)) or subscriber information (e.g., an international mobile subscriber identity (IMSI)).

The memory 730 (e.g., a memory 630 of FIG. 6) may include, for example, an embedded memory 732 or an external memory 734. The embedded memory 732 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 734 may include a flash drive, for example, a compact flash (CF), a secure digital (SD), a micro-SD, a mini-SD, an extreme digital (xD), a multimedia card (MMC), or a memory stick, and the like. The external memory 734 may operatively and/or physically connect with the electronic device 701 through various interfaces.

The sensor module 740 may measure, for example, a physical quantity or may detect an operation state of the electronic device 701, and may convert the measured or detected information to an electric signal. The sensor module 740 may include at least one of, for example, a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature/humidity sensor 740J, an illumination sensor 740K, or an ultraviolet (UV) sensor 740M. Additionally or alternatively, the sensor module 740 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 740 may further include a control circuit for controlling at least one or more sensors included therein. In various embodiments, the electronic device 701 may further include a processor configured to control the sensor module 740, as part of the processor 710 or to be independent of the processor 710. While the processor 710 is in a sleep state, the electronic device 701 may control the sensor module 740. In certain embodiments, the heating state determination module 120 can comprise the temperature/humidity sensor 740J.

The input device 750 may include, for example, a touch panel 752, a (digital) pen sensor 754, a key 756, or an ultrasonic input unit 758. The touch panel 752 may use, for example, at least one of a capacitive type, a resistive type, an infrared type, or an ultrasonic type. Also, the touch panel 752 may further include a control circuit. The touch panel 752 may further include a tactile layer and may provide a tactile reaction to a user.

The (digital) pen sensor 754 may be, for example, part of the touch panel 752 or may include a separate sheet for recognition. The key 756 may include, for example, a physical button, an optical key, or a keypad. The ultrasonic input unit 758 may allow the electronic device 701 to detect an ultrasonic wave generated by an input tool, through a microphone (e.g., a microphone 788) and to verify data corresponding to the detected ultrasonic wave.

The display 760 (e.g., a display 660 of FIG. 6) may include a panel 762, a hologram device 764, or a projector 766. The panel 762 may include the same or similar configuration to the display 760. The panel 762 may be implemented to be, for example, flexible, transparent, or wearable. The panel 762 and the touch panel 752 may be integrated into one module. The hologram device 764 may show a stereoscopic image in a space using interference of light. The projector 766 may project light onto a screen to display an image. The screen may be positioned, for example, inside or outside the electronic device 701. According to an embodiment, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-subminiature 778. The interface 770 may be included in, for example, a communication interface 670 shown in FIG. 6. Additionally or alternatively, the interface 770 may include, for example, a mobile high definition link (MHL) interface, an SD card/multimedia card (MMC) interface, or an infrared data association (IrDA) standard interface.

The audio module 780 may convert a sound and an electric signal in dual directions. At least some of components of the audio module 780 may be included in, for example, an input and output interface 650 shown in FIG. 6. The audio module 780 may process sound information input or output through, for example, a speaker 782, a receiver 784, an earphone 786, or the microphone 788, and the like.

The camera module 791 may be a device which captures a still image and a moving image. According to an embodiment, the camera module 791 may include one or more image sensors (not shown) (e.g., a front sensor or a rear sensor), a lens (not shown), an image signal processor (ISP) (not shown), or a flash (not shown) (e.g., an LED or a xenon lamp).

The power management module 795 may manage, for example, power of the electronic device 701. According to an embodiment, though not shown, the power management module 795 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 796 and voltage, current, or temperature thereof while the battery 796 is charged. The battery 796 may include, for example, a rechargeable battery or a solar battery.

The indicator 797 may display a specific state of the electronic device 701 or part (e.g., the processor 710) thereof, for example, a booting state, a message state, or a charging state, and the like. The motor 798 may convert an electric signal into mechanical vibration and may generate vibration or a haptic effect, and the like. Though not shown, the electronic device 701 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 8:
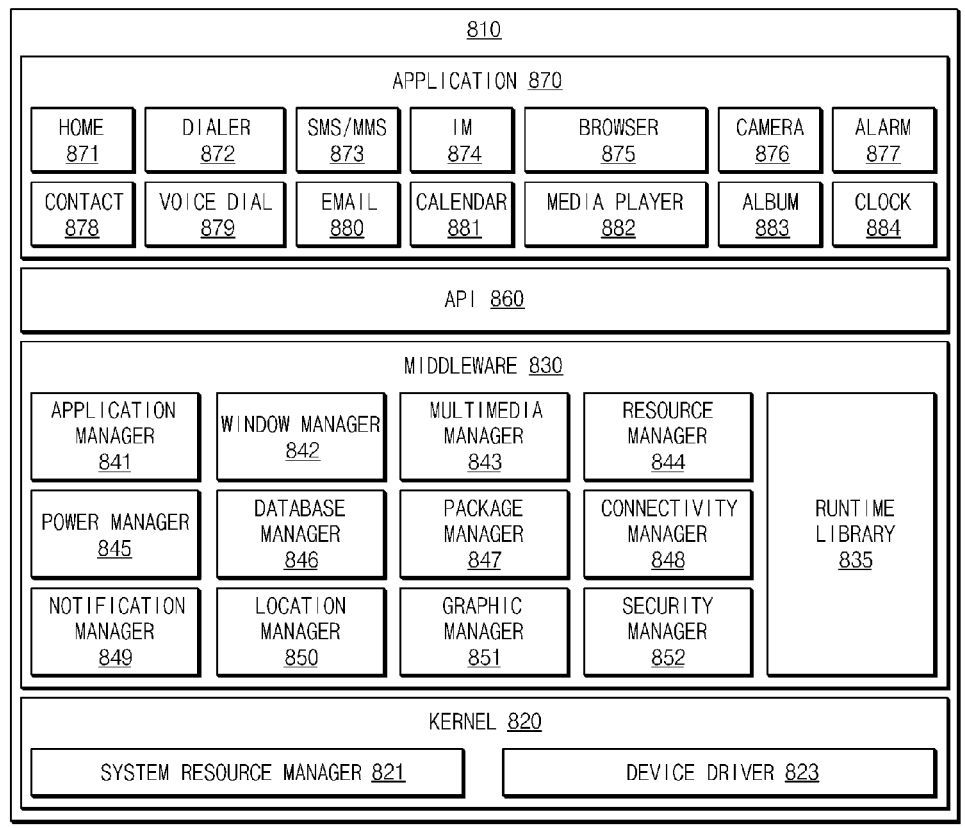
FIG. 8 is a block diagram illustrating a configuration of a program module according to various embodiments.

FIG. 8 is a block diagram illustrating a configuration of a program module according to various embodiments.

According to an embodiment, a program module 810 (e.g., a program 640 of FIG. 6) may include an operating system (OS) for controlling resources associated with an electronic device (e.g., an electronic device 601 of FIG. 6) and/or various applications (e.g., at least one application program 647 of FIG. 6) which are executed on the OS. The OS may be, for example, Android, iOS, Windows, Symbian, Tizen, or Bada, and the like.

Referring to FIG. 8, the program module 810 may include a kernel 820, a middleware 830, an application programming interface (API) 860, and/or at least one application 870. At least part of the program module 810 may be preloaded on the electronic device, or may be downloaded from an external electronic device (e.g., a first external electronic device 602, a second external electronic device 604, or a server 606, and the like of FIG. 6).

The kernel 820 (e.g., a kernel 641 of FIG. 6) may include, for example, a system resource manager 821 and/or a device driver 823. The system resource manager 821 may control, assign, or collect, and the like system resources. According to an embodiment, the system resource manager 821 may include a process management unit, a memory management unit, or a file system management unit, and the like. The device driver 823 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 830 (e.g., a middleware 643 of FIG. 6) may provide, for example, functions the application 870 needs in common, and may provide various functions to the application 870 through the API 860 such that the application 870 efficiently uses limited system resources in the electronic device. According to an embodiment, the middleware 830 (e.g., the middleware 643) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, or a security manager 852.

The runtime library 835 may include, for example, a library module used by a compiler to add a new function through a programming language while the application 870 is executed. The runtime library 835 may perform a function about input and output management, memory management, or an arithmetic function.

The application manager 841 may manage, for example, a life cycle of at least one of the at least one application 870. The window manager 842 may manage graphic user interface (GUI) resources used on a screen of the electronic device. The multimedia manager 843 may ascertain a format necessary for reproducing various media files and may encode or decode a media file using a codec corresponding to the corresponding format. The resource manager 844 may manage source codes of at least one of the at least one application 870, and may manage resources of a memory or a storage space, and the like.

The power manager 845 may act together with, for example, a basic input/output system (BIOS) and the like, may manage a battery or a power source, and may provide power information necessary for an operation of the electronic device. The database manager 846 may generate, search, or change a database to be used in at least one of the at least one application 870. The package manager 847 may manage installation or update of an application distributed by a type of a package file.

The connectivity manager 848 may manage, for example, wireless connection such as Wi-Fi connection or BT connection, and the like. The notification manager 849 may display or notify events, such as an arrival message, an appointment, and proximity notification, by a method which is not disturbed to the user. The location manager 850 may manage location information of the electronic device. The graphic manager 851 may manage a graphic effect to be provided to the user or a user interface (UI) related to the graphic effect. The security manager 852 may provide all security functions necessary for system security or user authentication, and the like. According to an embodiment, when the electronic device (e.g., an electronic device 601 of FIG. 6) has a phone function, the middleware 830 may further include a telephony manager (not shown) for managing a voice or video communication function of the electronic device.

The middleware 830 may include a middleware module which configures combinations of various functions of the above-described components. The middleware 830 may provide a module which specializes according to kinds of OSs to provide a differentiated function. Also, the middleware 830 may dynamically delete some of old components or may add new components.

The API 860 (e.g., an API 645 of FIG. 6) may be, for example, a set of API programming functions, and may be provided with different components according to OSs. For example, in case of Android or iOS, one API set may be provided according to platforms. In case of Tizen, two or more API sets may be provided according to platforms.

The application 870 (e.g., an application program 647 of FIG. 6) may include one or more of, for example, a home application 871, a dialer application 872, a short message service/multimedia message service (SMS/MMS) application 873, an instant message (IM) application 874, a browser application 875, a camera application 876, an alarm application 877, a contact application 878, a voice dial application 879, an e-mail application 880, a calendar application 881, a media player application 882, an album application 883, a clock application 884, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 870 may include an application (hereinafter, for better understanding and ease of description, referred to as "information exchange application") for exchanging information between the electronic device (e.g., the electronic device 601) and an external electronic device (e.g., the first external electronic device 602 or the second external electronic device 604). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 602 or the second external electronic device 604). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 602 or the second external electronic device 604) which communicates with the electronic device, an application which operates in the external electronic device, or a service (e.g., a call service or a message service) provided from the external electronic device.

According to an embodiment, the application 870 may include an application (e.g., the health card application of a mobile medical device) which is preset according to attributes of the external electronic device (e.g., the first external electronic device 602 or the second external electronic device 604). According to an embodiment of the present disclosure, the application 870 may include an application received from the external electronic device (e.g., the server 606, the first external electronic device 602, or the second external electronic device 604). According to an embodiment of the present disclosure, the application 870 may include a preloaded application or a third party application which may be downloaded from a server. Names of the components of the program module 810 according to various embodiments of the present disclosure may differ according to kinds of OSs.

According to various embodiments, at least part of the program module 810 may be implemented with software, firmware, hardware, or at least two or more combinations thereof. At least part of the program module 810 may be implemented (e.g., executed) by, for example, a processor (e.g., a processor 710 of FIG. 7). At least part of the program module 810 may include, for example, a module, a program, a routine, sets of instructions, or a process, and the like for performing one or more functions.

The terminology "module" used herein may mean, for example, a unit including one of hardware, or hardware with memory storing software, and/or firmware. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments, at least part of a device (e.g., modules or the functions) or a method (e.g., operations) may be implemented with, for example, instructions stored in computer-readable storage media which have a program module. When the instructions are executed by a processor (e.g., a processor 620 of FIG. 6), one or more processors may perform functions corresponding to the instructions. The computer-readable storage media may be, for example, a memory 630 of FIG. 6.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

According to various embodiments, a storing medium may store instructions. The instructions may be set, when executed by at least one processor, for instructing the at least one processor to perform at least one operation. The at least one operation may include obtaining multimedia data through at least one camera operatively connected with a portable electronic device, collecting context information associated with a network connected with an external electronic device based on the portable electronic device or a communication interface, controlling a transmit power function associated with setting a transmission time of the multimedia data or setting a transmit power of the multimedia data, based on part of the context information, and transmitting the multimedia data using the transmit power function.

According to various embodiments, the electronic device may reduce current consumption during a transmission pause time by controlling a transmit power function based on context information of the electronic device (e.g., heating information of the electronic device or traffic information of a network, and the like). Also, the electronic device may reduce heating by current consumption.

Modules or program modules according to various embodiments may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added. Embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. A portable electronic device, comprising:
a communication interface;
a memory configured to store multimedia data obtained through at least one camera operatively connected with the memory; and
a processor,
wherein the processor is configured to:
obtain a first bitrate of a network and second bitrate of the multimedia data, wherein the second bitrate is related to an amount of data used when the multimedia data is encoded,
determine time information associated with transmission of the multimedia data based on a ratio value in which the ratio of the second bitrate to the first bitrate is calculated, and
transmit at least part of the multimedia data to an external electronic device through the network using the communication interface based on the time information.

2. The portable electronic device of claim 1, wherein the processor is further configured to:
obtain heating information of the portable electronic device; and
determine the time information based on the heating information.

3. The portable electronic device of claim 2, wherein the processor is further configured to change the time information, if the heating information is changed.

4. The portable electronic device of claim 1, wherein the processor is further configured to determine a supply power level of a transmitter which transmits the multimedia data based on the first bitrate and the second bitrate.

5. The portable electronic device of claim 1, wherein the processor is configured to receive at least part of the multimedia data from another external electronic device different from the external electronic device.

6. The portable electronic device of claim 5, further comprising:
another communication interface to be configured to be different from the communication interface, for receiving the at least part of the multimedia data from the another external electronic device different from the external electronic device.

7. The portable electronic device of claim 1, wherein the time information comprises at least one of a transmission time of the multimedia data, a transmission pause time of the multimedia data and an additional transmission time of the multimedia data.

8. The portable electronic device of claim 1, wherein the processor is further configured to change the time information, if at least one of the first bitrate and the second bitrate is changed.

9. A method in a portable electronic device, the method comprising:
obtaining multimedia data through at least one camera operatively connected with the portable electronic device;

obtaining a first bitrate of a network and second bitrate of the multimedia data, wherein the second bitrate is related to an amount of data used when the multimedia data is encoded;

determining time information associated with transmission of the multimedia data based on a ratio value in which the ratio of the second bitrate to the first bitrate is calculated; and transmitting at least part of the multimedia data to an external electronic device through the network using a communication interface based on the time information.

10. The method of claim 9, wherein obtaining the multimedia data comprises:

receiving at least part of the multimedia data from another external electronic device different from the external electronic device.

11. The method of claim 9, wherein determining the time information comprises determining at least one of a transmission time of the multimedia data, a transmission pause time of the multimedia data and an additional transmission time of the multimedia data.

12. The method of claim 9, wherein determining the time information comprises:

calculating a ratio value, in which the ratio of the second bitrate to the first bitrate is calculated; and determining the time information based on the ratio value.

13. The method of claim 9, wherein transmitting the at least part of the multimedia data comprises:

continuously transmitting at least one portion of the multimedia data until a first time when an amount of data which remains in a buffer is less than or equal to a threshold.

14. The method of claim 13, wherein transmitting the at least part of the multimedia data further comprises:

additionally transmitting at least another portion of the multimedia data for a second time after the first time.

15. The method of claim 14, further comprising:

obtaining a third bitrate of the network after the first time or the second time;

calculating another ratio value, in which the ratio of the second bitrate to the third bitrate is calculated; and determining the time information based on the another ratio value.

16. The method of claim 14, wherein additionally transmitting the at least another portion of the multimedia data for the second time comprises:

obtaining a third bitrate of the network, if a condition that the amount of data which remains in the buffer is greater than the threshold continues for a designated time within the second time;

calculating another ratio value, in which the ratio of the second bitrate to the third bitrate is calculated; and determining the time information based on the another ratio value.

17. The method of claim 9, further comprising changing the time information, if at least one of the first bitrate and the second bitrate is changed.

* * * * *